United States Patent [19]
McLaughlin et al.

[11] Patent Number: 5,384,577
[45] Date of Patent: Jan. 24, 1995

[54] COMBINATION DISPLAY BACKLIGHT AND LIGHT SENSOR

[75] Inventors: Kevin T. McLaughlin, Lake Worth; John J. Parkes, Boynton Beach, both of Fla.

[73] Assignee: Motorola, Inc., Schaumburg, Ill.

[21] Appl. No.: 886,214

[22] Filed: May 21, 1992

[51] Int. Cl.⁶ .............................................. G09G 3/34
[52] U.S. Cl. ........................................... 345/102; 359/48
[58] Field of Search ............... 340/767, 781, 784, 793; 315/169.1, 169.3; 250/214 AL, 214 R, 214 B, 208, 221; 358/236, 254, 59; 345/102, 76, 207; 359/48

[56] References Cited

U.S. PATENT DOCUMENTS

| | | | |
|---|---|---|---|
| 2,792,447 | 5/1957 | Kazan | 358/59 |
| 2,858,363 | 10/1958 | Kazan | 358/59 |
| 3,566,014 | 2/1971 | Norem | 358/5 |
| 3,668,861 | 6/1972 | Mitsui | 368/82 |
| 4,024,389 | 5/1977 | Kanatani et al. | 313/509 X |
| 4,500,173 | 2/1985 | Leibowitz et al. | 315/169.3 X |
| 4,518,961 | 5/1985 | Davis et al. | 340/825.44 |
| 4,561,044 | 12/1985 | Ogura et al. | 358/236 X |
| 4,562,478 | 12/1985 | Hirasawa | 358/263 |
| 4,644,350 | 2/1987 | Ishii | 340/825.44 |
| 4,649,538 | 3/1987 | DeLuca et al. | 371/24 |
| 4,713,659 | 12/1987 | Oyagi et al. | 340/825.44 |
| 4,755,816 | 7/1988 | DeLuca | 340/825.44 |
| 4,809,078 | 2/1989 | Yabe et al. | 358/263 |
| 4,975,692 | 12/1990 | Tateyama | 345/102 |
| 5,030,943 | 7/1991 | Anglin | 340/781 X |

FOREIGN PATENT DOCUMENTS

| | | | |
|---|---|---|---|
| 2129690 | 5/1990 | Japan | 345/102 |
| 0094220 | 4/1991 | Japan | 340/767 |
| 2225894 | 6/1990 | United Kingdom | 345/102 |

Primary Examiner—Tommy P. Chin
Assistant Examiner—A. Au
Attorney, Agent, or Firm—Pablo Meles; John H. Moore

[57] ABSTRACT

A display device (20) comprises a display (21) for displaying information and an electroluminescent panel (22) located contiguous to the display for sensing ambient light and lighting the display when the ambient light is below a threshold.

4 Claims, 2 Drawing Sheets

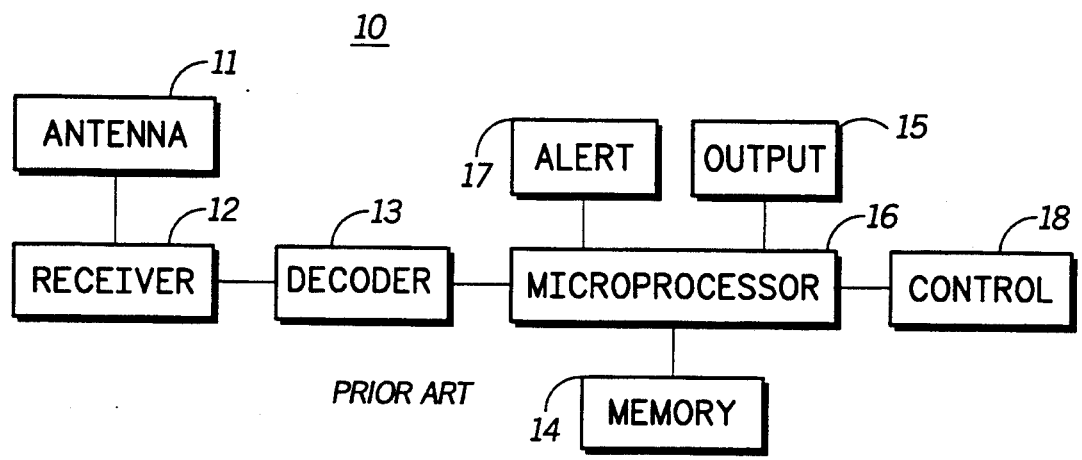
FIG.1 *PRIOR ART*
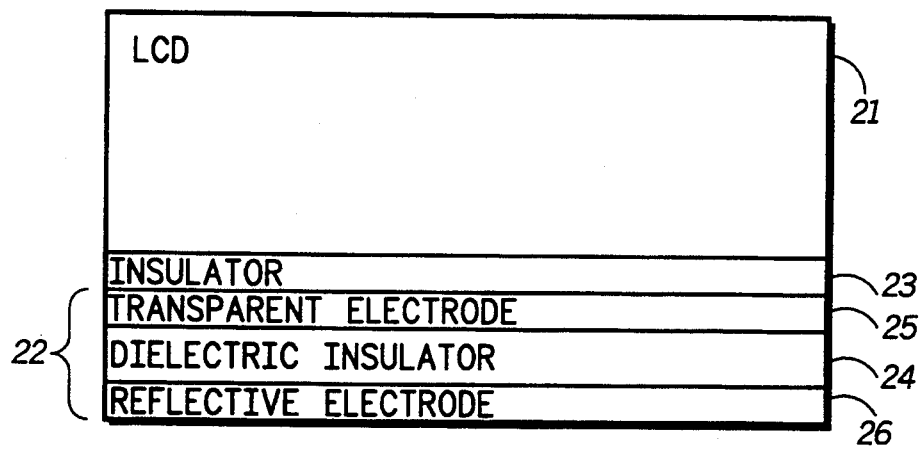
FIG.2

COMBINATION DISPLAY BACKLIGHT AND LIGHT SENSOR

FIELD OF THE INVENTION

This invention relates in general to information displays, and more particularly to displays having a backlight for improving the visibility of information presented on the display.

BACKGROUND OF THE INVENTION

Visual displays for presenting information exist in several known devices such as calculators, watches, and selective call receivers. Conventionally, the display comprises a liquid crystal display (LCD) that may be selectively programmed to display the information. Typically, the display includes either a reflective element contiguous to the display for reflecting light or a backlight mechanism for providing light through the display to improve the readability of the information. Still some previously known electronic devices having displays have included a light sensor separate from the display for enabling the backlight mechanism in low ambient light conditions.

However, the light sensor requires additional space on the electronic device housing the display and may cause environmental problems by allowing dust, humidity, etc. access to the circuitry.

SUMMARY OF THE INVENTION

A display device comprises a display for displaying information and an electroluminescent panel located contiguous to the display for sensing ambient light and lighting the display when the ambient light is below a threshold.

BRIEF DESCRIPTION OF THE DRAWINGS

FIG. 1 is a block diagram of a previously known selective call receiver.

FIG. 2 is a cross section of a visual display and electroluminescent panel in accordance with an embodiment of the present invention.

DESCRIPTION OF A PREFERRED EMBODIMENT

Figure 3:
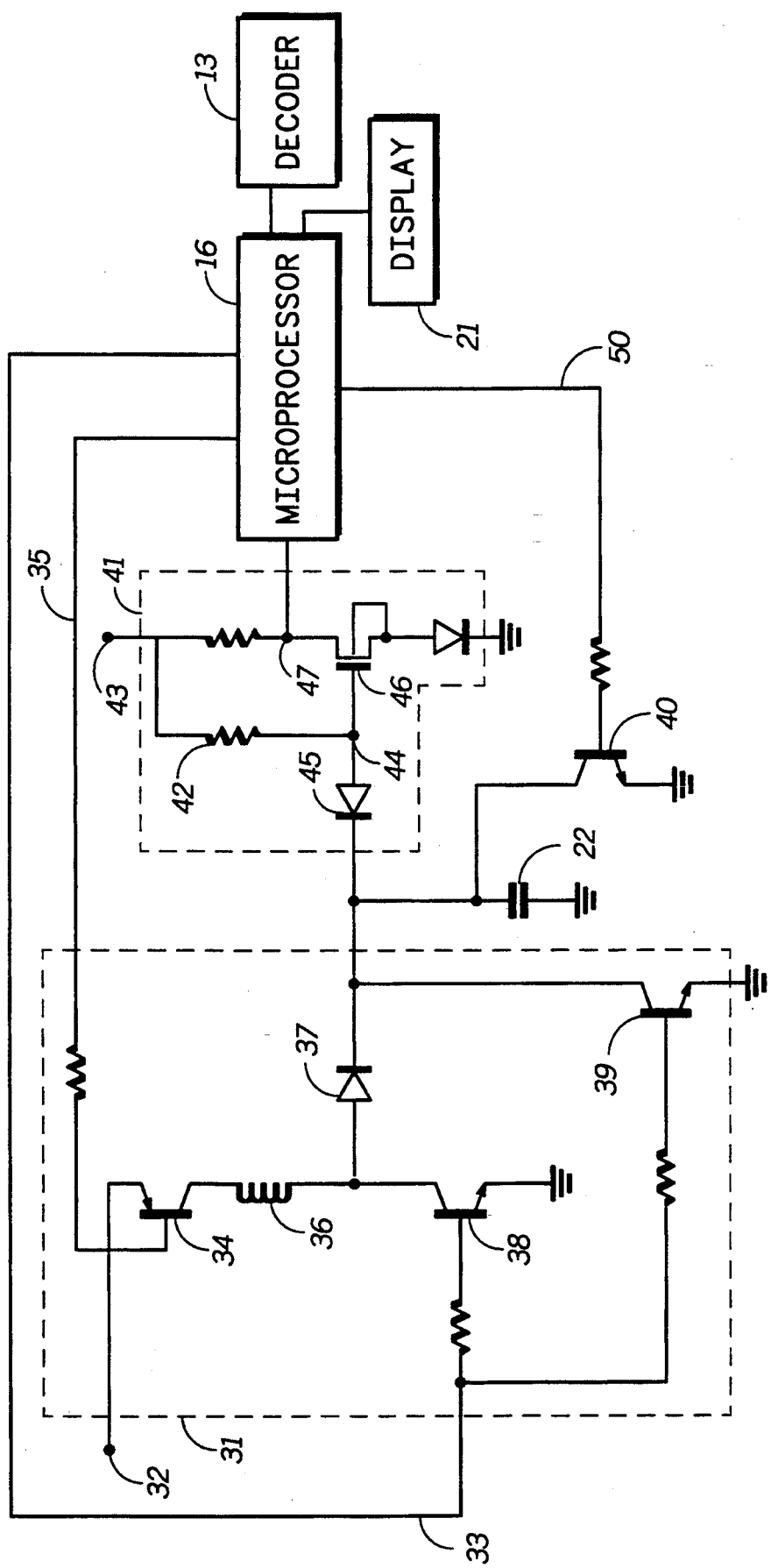
FIG. 3 is a partial schematic diagram in accordance with an embodiment of the present invention.

Referring to FIG. 1, a selective call radio receiver 10, e.g., a pager, comprises an antenna 11 that provides an RF carrier signal that is demodulated by the receiver 12 to provide a signal suitable for processing by the decoder 13 in a manner well known to one skilled in the art. The decoder 13 processes the recovered signal to decode the address and optional message data contained therein, and if the selective call receiver includes an optional voice output, the recovered audio components of the original signal received by the antenna 11. For selective call receivers with message storage, the recovered message or voice output is stored in the memory 14 for subsequent "playback" by an output 15. In operation, the microcomputer 16 compares information contained in the recovered signal with predetermined addresses contained in the memory 14, and when substantially similar, alerts the user that a signal has been received by alert mechanism 17. The optional output module 15 will automatically, or when manually selected by controls 18, present the message.

For a more detailed description of the structure and operation of a selective call radio paging receiver of the type shown in FIG. 1 and known to those skilled in the art, reference is made to U.S. Pat. No. 4,518,961; U.S. Pat. No. 4,649,538; and U.S. Pat. No. 4,755,816.

Referring to FIG. 2, a display device 20 in accordance with an embodiment of the present invention comprises a display 21, e.g., a liquid crystal display (LCD), for displaying information in a manner well known to those skilled in the art. An electroluminescent panel 22 is spaced apart from the display 21 by an insulator 23. The electroluminescent panel 22 comprises a phosphorous dielectric insulating material 24 positioned between transparent electrode 25 and reflective electrode 26. The transparent electrode 25 and reflective electrode 26 are coupled to the circuitry to be described in FIG. 3 by connecting conductors thereto. The transparent electrode 25 comprises, e.g., Indium tin oxide and the reflective electrode 26 comprises, e.g., aluminum.

In operation, an alternating voltage is applied to the electrodes 25 and 26, causing the phosphorous dielectric insulating material 24 to emit light which is directed in part by the reflective electrode 26, through the display 21. Additionally, the electroluminescent panel 22 functions as a ambient light sensor in a manner to be discussed hereinafter.

Referring now to FIG. 3, the operation of the electroluminescent panel 22 may be described as comprising three modes: charging (illuminating) the electroluminescent panel 22, sensing of ambient light, and standby.

Charging circuitry 31 for charging the electroluminescent panel 22 when enabled by a clock signal 33 from the microprocessor 16 is coupled between a terminal 32 capable of receiving a supply voltage, e.g., a battery voltage, and the electroluminescent panel 22. The charging circuitry 31 comprises a PNP transistor 34 responsive to a voltage enable signal 35 from the microprocessor 16 for providing the supply voltage to coil 36. Voltage pulses from the coil 36 are supplied through the diode 37 to the electroluminescent panel 22 as determined by the disabling of transistors 38 and 39 by the clock signal 33. On alternate pulses of clock signal 33, transistors 38 and 39 are enabled for allowing current to flow through the coil 36 and discharging voltage from the electroluminescent panel 22, respectively.

Initially, during the sensing mode transistor 40 is enabled by the microprocessor 16 for discharging any voltage from the electroluminescent panel 22. Sensing circuitry 41 comprises a resistor 42 coupled between a supply voltage terminal 43 and a node 44. A diode 45 allows current through resistor 42 to the electroluminescent panel 22 in the sensing mode while blocking current in the charging mode. In the sensing mode, when the electroluminescent panel 22 is not being charged by the charging circuitry 31, the resistor 42 and capacitive electroluminescent panel 22 defines an RC time constant that provides a rising voltage at node 44. When this rising voltage reaches a threshold, transistor 46 is enabled and pulls node 47 low. This low signal at node 47 causes the microprocessor to enable the charging circuit 31.

In the standby mode, the clock signal 33 is low, the discharging signal 50 and the signal 35 are high. The state of the microprocessor signals 33, 35, 47, and 50 are illustrated for each of the three modes in the table as follows:

| MODE | MICROPROCESSOR SIGNALS | | | |
| --- | --- | --- | --- | --- |
|  | 33 | 35 | 47 | 50 |
| CHARGING | 2k HZ | L | X | L |
| SENSING | L | H | L/ON H/OFF | H/L |
| STANDBY | L | H | X | H | where L equals low, H equals high, and X equals "don't care".

In summary, in the standby mode when a message has not been received or the user does not desire to read a message, signal 33 is low and signals 35 and 50 are high. When a message is received and is about to be read, or when it is determined by the user that a stored message should be read, the microprocessor 16 in response to the received message in the first case or in response to a user input to control 18 in the second case, will cause signal 50 to initially go high to discharge the electroluminescent panel 22 and then go low. Signal 35 goes high, signal 33 goes low, and signal 47 goes low if the selective call receiver is on and high if the selective call receiver is off. Then, if the ambient light is so low as to cause the voltage at node 47 to below the threshold, the signals 35 and 50 go low and signal 33 assumes a clock signal, e.g., 2k HZ, causing the electroluminescent panel 22 to charge and provide a backlight for the display 21.

We claim:

1. A display, comprising:
   display means for displaying information; and
   an electroluminescent panel located contiguous to the display means for sensing ambient light and lighting the display means when the ambient light is below a threshold, wherein the electroluminescent panel comprises first and second electrodes and a phosphorus dielectric insulation material located between the first and second electrodes;
   current means coupled to the electroluminescent panel for providing a charge thereto;
   a resistor coupled between a first supply voltage and the electroluminescent panel; and
   a microprocessor coupled to a first node between the electroluminescent panel and the resistor for sensing a voltage indicating the level of ambient light on the electroluminescent panel and coupled to the current means for enabling the charging of the electroluminescent panel in response to the voltage being below a predetermined level, wherein the current means comprises an inductor having a first terminal coupled to the first node, and a second terminal, a first transistor having current carrying electrodes coupled between a supply voltage terminal and the second terminal of the inductor, and a control electrode coupled to the microprocessor, a second transistor having current carrying electrodes coupled between the first node and a second supply voltage terminal, and a control electrode coupled to the microprocessor, a third transistor having current carrying electrodes coupled between the first node and the second supply voltage terminal, and a control electrode coupled to the microprocessor.

2. The display according to claim 1, further comprising:
   a fourth transistor having current carrying electrodes coupled between a second node and the second supply voltage terminal, and a control electrode coupled to the first node, the second node coupled to the first supply voltage terminal and the microprocessor.

3. A selective call receiver comprising:
   receiver means for receiving a signal comprising information;
   display means coupled to the receiver means for displaying the information; and
   an electroluminescent panel located contiguous to the display means for sensing ambient light and lighting the display means when the ambient light is below a threshold, wherein the electroluminescent panel comprises first and second electrodes and a phosphorus dielectric insulation material located between the first and second electrodes;
   current means coupled to the electroluminescent panel for providing a charge thereto;
   a resistor coupled between a first supply voltage and the electroluminescent panel; and
   a microprocessor coupled to a first node between the electroluminescent panel and the resistor for sensing a voltage indicating the level of ambient light on the electroluminescent panel and coupled to the current means for enabling the charging of the electroluminescent panel in response to the voltage being below a predetermined level, wherein the current means comprises an inductor having a first terminal coupled to the first node, and coupled to a second terminal, a first transistor having current carrying electrodes coupled between a supply voltage terminal and the second terminal of the inductor, and a control electrode coupled to the microprocessor, a second transistor having current carrying electrodes coupled between the first node and a second supply voltage terminal, and a control electrode coupled to the microprocessor, and a third transistor having current carrying electrodes coupled between the first node and the second supply voltage terminal, and a control electrode coupled to the microprocessor.

4. The display according to claim 3, further comprising:
   a fourth transistor having current carrying electrodes coupled between a second node and the second supply voltage terminal, and a control electrode coupled to the first node, the second node coupled to the first supply voltage terminal and the microprocessor.

* * * * *